United States Patent [19]
Chung et al.

[11] Patent Number: 6,149,804
[45] Date of Patent: Nov. 21, 2000

[54] BOTTLED WATER COOLER WITH BUILT-IN OXYGEN GENERATOR AND OXYGEN INJECTION SYSTEM

[75] Inventors: Daniel Z. Chung, Palisades Park, N.J.; Jin I. Chung, Philadelphia, Pa.

[73] Assignee: 02 Technologies, Inc., Ridgefield, N.J.

[21] Appl. No.: 09/419,339

[22] Filed: Oct. 15, 1999

Related U.S. Application Data

[60] Provisional application No. 60/104,541, Oct. 16, 1998.

[51] Int. Cl.[7] .................. B67D 5/58; B67D 5/62
[52] U.S. Cl. .................. 210/192; 210/205; 96/133; 222/146.6; 222/190
[58] Field of Search .................. 210/138, 188, 210/192, 205, 435, 758; 96/130, 133; 222/146.6, 189.06, 190

[56] References Cited

U.S. PATENT DOCUMENTS

| | | | |
|---|---|---|---|
| 3,692,180 | 9/1972 | Laraus | 210/139 |
| 3,699,776 | 10/1972 | Laraus | 62/157 |
| 3,726,404 | 4/1973 | Troglione | 210/139 |
| 3,843,521 | 10/1974 | Zeff | 210/138 |
| 4,176,061 | 11/1979 | Stopka | 210/63 |
| 4,552,571 | 11/1985 | Dechene | 55/21 |
| 4,636,226 | 1/1987 | Canfora | 55/68 |
| 4,698,075 | 10/1987 | Dechene | 55/163 |
| 4,869,733 | 9/1989 | Stanford | 55/21 |
| 5,092,993 | 3/1992 | Goodwin | 210/758 |
| 5,106,495 | 4/1992 | Hughes | 210/139 |
| 5,190,648 | 3/1993 | Ramsauer | 210/172 |
| 5,366,619 | 11/1994 | Matsui et al. | 210/139 |
| 5,868,944 | 2/1999 | Wright et al. | 210/758 |
| 5,911,341 | 6/1999 | Donselman et al. | 222/129 |
| 5,928,610 | 7/1999 | Moran et al. | 422/120 |

*Primary Examiner*—Duane Smith
*Assistant Examiner*—Frank M. Lawrence
*Attorney, Agent, or Firm*—Brian S. Steinberger; Law Offices of Brian S. Steinberger

[57] ABSTRACT

A bottled water/tap water cooler and compact oxygen generator system combined within a single housing structure. The oxygen generator includes an air compressor for generating compressed air and uses two molecular sieve beds that operate one after the other. As a first molecular sieve bed absorbs nitrogen, up to approximately 95% pure oxygen is allowed to pass therethrough to a flow meter and into a diffuser which passes the oxygen into a purified drinking water reservoir supplied by the bottled water or filtered tap water. After the first molecular sieve bed is full, the second molecular sieve bed activates and starts absorbing nitrogen while allowing oxygen to pass therethrough, simultaneously, nitrogen is vented from the first molecular sieve into the atmosphere. The first and second molecular sieve beds alternate with one another allowing the system to run continuously by using timer controlled dual 3-way valves.

16 Claims, 4 Drawing Sheets

BOTTLED WATER COOLER WITH BUILT-IN OXYGEN GENERATOR AND OXYGEN INJECTION SYSTEM

This invention relates to water coolers, and in particular to a bottled/tap water cooler having a built in oxygen generator for injecting oxygen into the water supply, and claims priority to U.S. Provisional Application Ser. No. 60/104,541 filed Oct. 16, 1998.

BACKGROUND AND PRIOR ART

The most important element to sustain life is the air we breathe. It is well known that all living creatures require a continuous supply of oxygen. However, the general quality of the air we breathe only contains approximately 20% oxygen. Fossil tests have indicated that past air from ancient times contained approximately twice the oxygen content as today's polluted air. Inhaling pure oxygen can be done, but prolonged inhalation can diminish one's lung capacity over time creating an unhealthy problem.

The second most necessary element for survival is water. However, public water supplies contain a substantial amount of toxic chemicals such as chlorine that is used to sanitize water. Bottled water has become more and more popular in recent times due to its' pureness, lack of chemicals and better taste than tap water. As a result water cooler systems have become more common place.

Water companies have attempted to add concentrated oxygen into their water supply by using large size plant generators during the bottling stage. However, the oxygen concentration in these oxygenated water supplies decreases over time because oxygen dissipates through the PET bottles as the bottled water takes time to be delivered to the end user customer. Thus, the longer the delivery time and the amount of time the product sits on the retail shelf the less oxygen content within the bottled water.

Some water companies have attempted to overcome the depreciation problem by adding excessive oxygen concentration during the bottling stage. However, the excessive oxygen concentration can alter the spring water taste of bottled water. The higher the level of dissolved oxygen, the faster oxygen dissipates out of the water.

The inventors are aware of the following U.S. Pat. No. 3,692,180 to La Raus; U.S. Pat. No. 3,699,776 to La Raus; U.S. Pat. No. 3,726,404 to Troglione; U.S. Pat. No. 3,843,521 to Zeff; U.S. Pat. No. 4,176,061 to Stopka; U.S. Pat. No. 4,552,571 to Dechene; U.S. Pat. No. 4,636,226 to Canfora; U.S. Pat. No. 4,698,075 to Dechene; U.S. Pat. No. 4,869,733 to Stanford; U.S. Pat. No. 5,106,495 to Hughes; U.S. Pat. No. 5,190,648 to Ramsauer; U.S. Pat. No. 5,366,619 to Matsui et al.; and U.S. Pat. No. 5,928,610 to Moran et al. However, none of these patents adequately overcomes all the problems with the prior techniques previously described. For example, many of these patents are concerned with injecting ozone and not oxygen into a water supply. Additionally, these patents generally use large, complex and/or expensive components that would not be suitable for a bottled water cooler or tap water cooler.

SUMMARY OF THE INVENTION

The first objective of the present invention is to provide a system for oxygenating water in a bottle/tap water cooler that maintains the sparkling taste of the water while maximizing the oxygen level content.

The second object of this invention is to provide a compact oxygenation generator for a bottle/tap water cooler that is built into the cooler housing.

A preferred embodiment of the invention includes incorporating an oxygen generator and an oxygen injector/diffuser into a bottle/tap water cooler with water reservoir. Typical spring water or purified water contains between approximately 3 milligrams/liter,mg/l (or parts per million, ppm) and approximately 7 mg/l of dissolved oxygen and the saturation level of dissolved oxygen in water is known to be approximately 10 mg/l depending on certain conditions such as temperature. Using the subject invention, up to approximately 95% pure oxygen can be generated onsite and injected into the water reservoir. The subject invention can increase the level of dissolved oxygen in the water to a level of "super-saturation" (anything greater than normal saturation level) with dissolved oxygen (DO) levels of greater than 30 mg/l.

A novelty of this device is that both the oxygen generation and the injection of the oxygen into the water are done within the cooler itself. No special handling nor special treatment of the water is required. The water placed on coolers with this device installed in it is not "oxygenated", and does not contain an elevated DO level, before the cooler's system begins to operate.

The injection of oxygen into the reservoir can be done with a diffuser. Alternatively, the injection is done with a Venturi-Type nozzle injector. Tests on water withdrawn from the subject invention system have a DO level remaining at "super-saturated" levels for greater than four hours (much longer than the period normally used to consume a glass of water.).

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
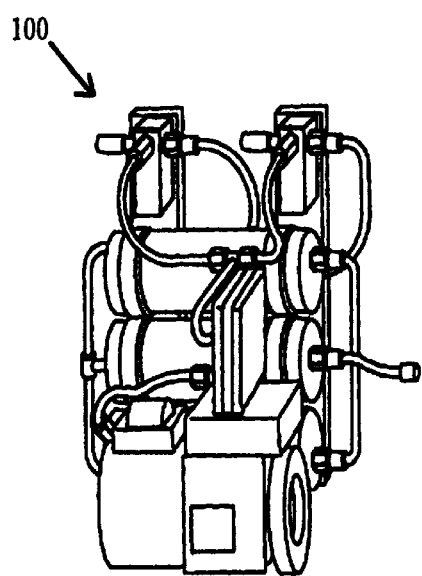
FIG. 1 is a perspective view of the novel oxygen generator system of the subject invention.

FIG. 1 is a perspective view of the novel oxygen generator system 100 of the subject invention and can have overall dimensions of approximately 7½ inches wide by approximately 9 inches high by approximately 6 inches deep, and fit into a housing 10 having dimensions of approximately 10 to approximately 42 inches high, approximately 7 to approximately 18 inches wide and approximately 8 to approximately 18 inches deep.

Figure 2:
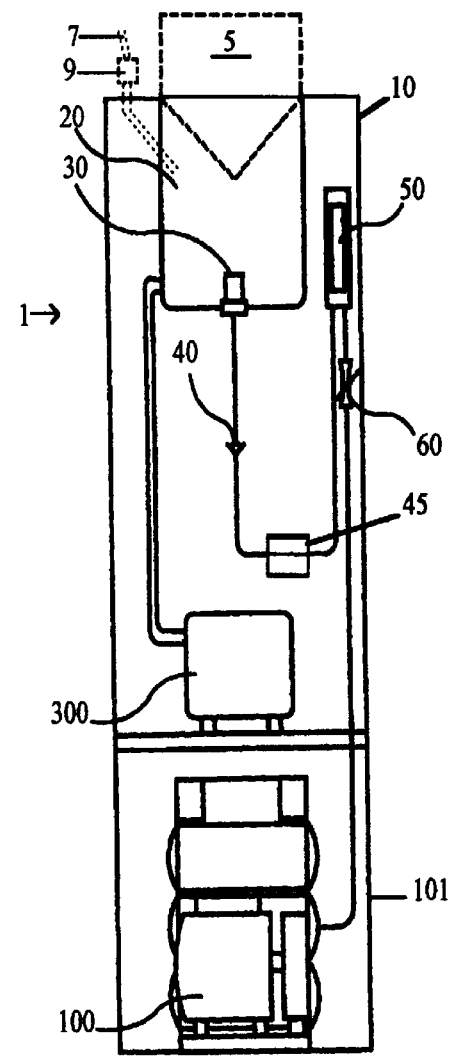
FIG. 2 is a side view of the water reservoir, cooling components and the oxygen generator system of FIG. 1 within a single housing.
Figure 3:
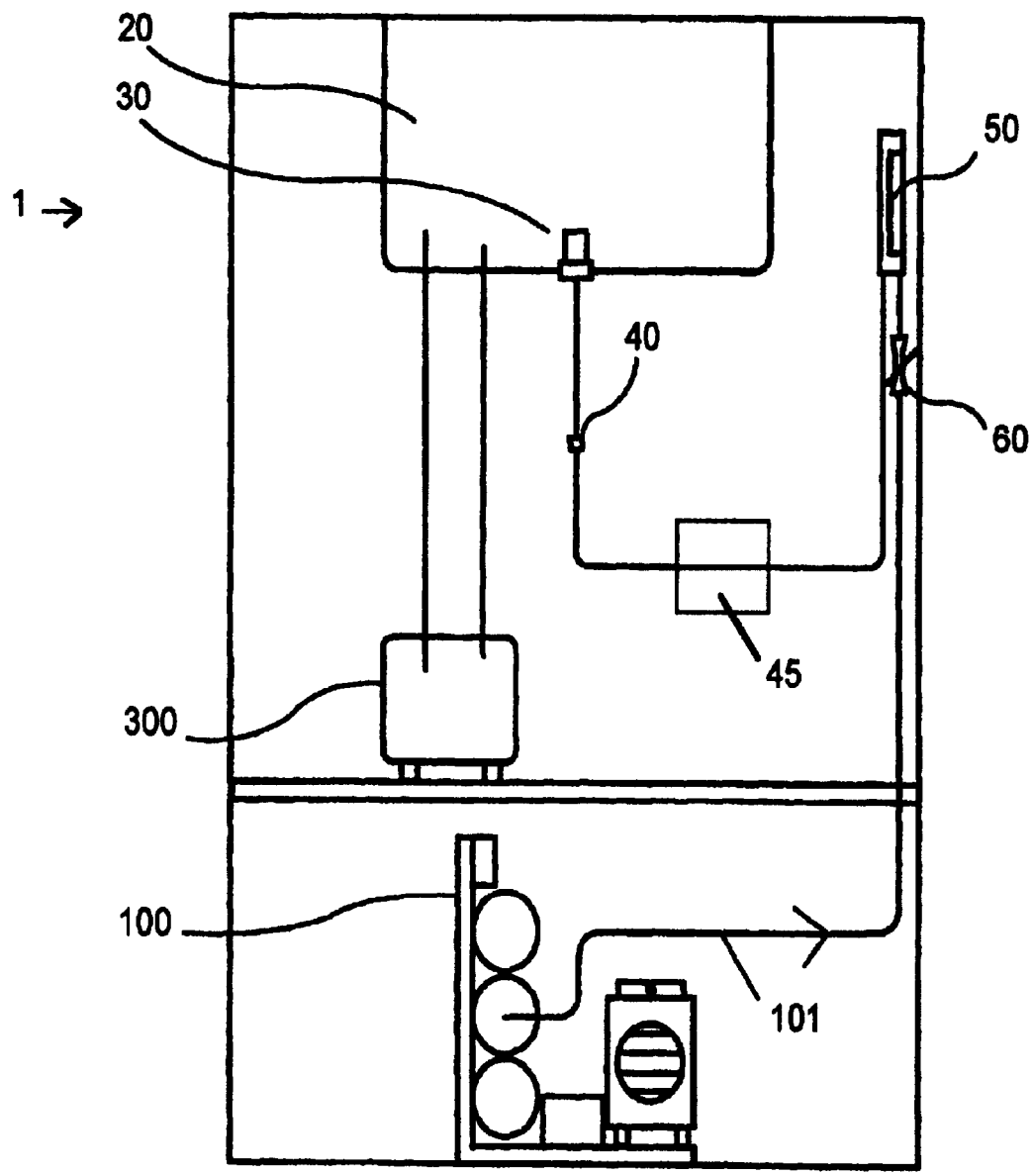
FIG. 3 is a front view of FIG. 2 along arrow A.

FIG. 2 is a side view 1 of the water reservoir, cooling compressor 300 and the oxygen generator system 100 of FIG. 1 within a single housing 10. FIG. 3 is a front view of FIG. 2 along arrow A. The cooling compressor 300 can be a typical cooling compressor such as that described in U.S. Pat. No. 3,699,776 to La Raus, incorporated by reference.

Referring to FIGS. 2–3, a water reservoir 10 having water therein can support a bottled water container 5. Alternatively, water can be supplied by a line source 7 from an exterior water purifier unit, a tap water supply, and the like. An added disposable filter 9 can be used to further filter out incoming water. A cooling system 200 (shown in more detail in FIG. 5) can cool the reservoir water supply 10. An oxygen generator system 100 (described and shown in FIG. 4) supplies oxygen via line 101 to a needle valve 60 that controls the flow of oxygen into an oxygen flow meter 50 that meters and can visually indicate the amount of oxygen that goes into reservoir 20. From meter 50, the generated oxygen passes through an air filter 45 such as an in-line bacteria filter from AG Industries of Missouri, to kill bacteria within the oxygen supply. Oxygen then passes to a check valve 40 that prevents a backflow of the oxygen, and there-after to diffuser 30 which injects oxygen into the bottom of reservoir 20 oxygenating the water supply therein. The diffuser 30 can include tiny holes which can allow the oxygen to be broken up into small bubbles that rise within the reservoir 20. A diffuser that can be used is described in U.S. Pat. No. 3,692,180 and 3,699,776 to La Raus which are both incorporated by reference.

Figure 4:
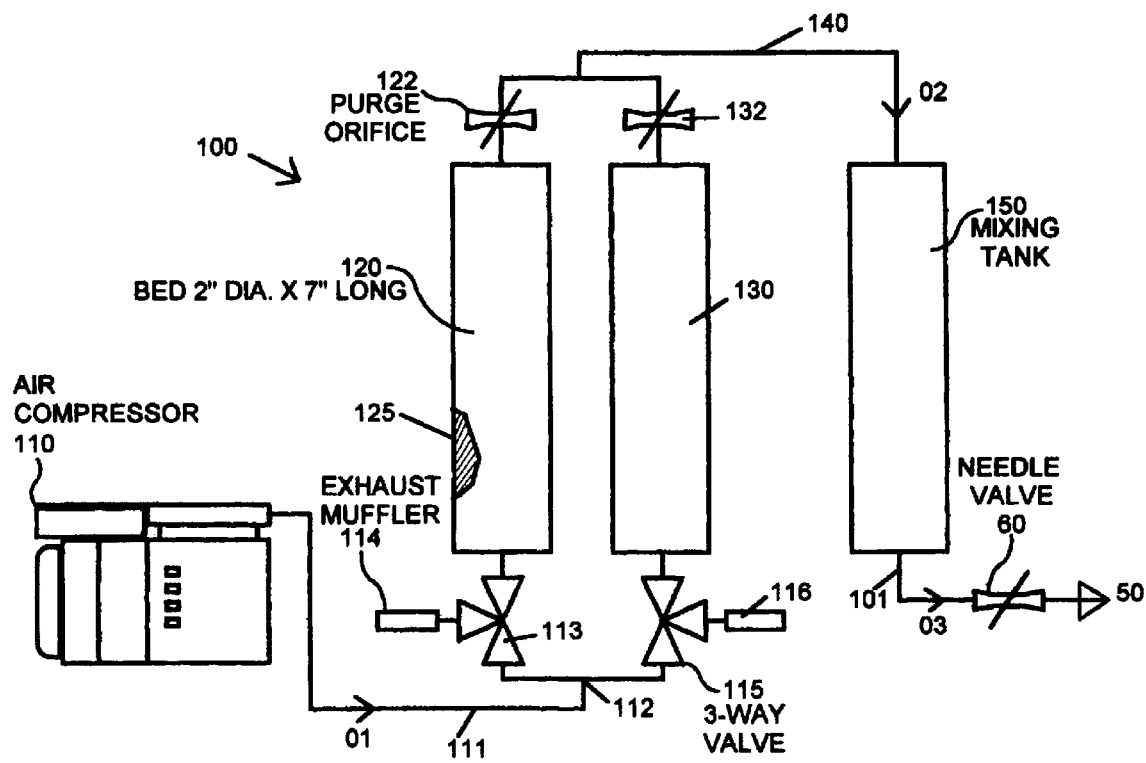
FIG. 4 is a schematic view of the oxygen generator system of FIGS. 1–3.
Figure 5:
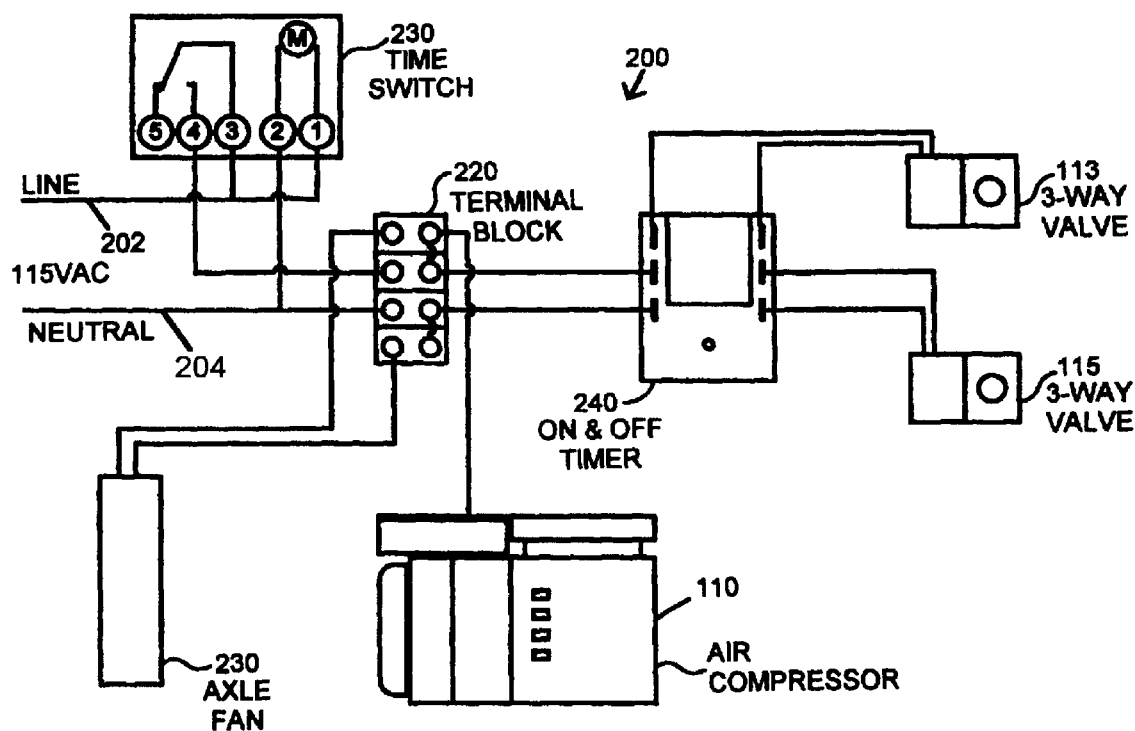
FIG. 5 is a schematic view of the timer controls for the 3-way valves used in oxygen generating system of FIG. 4.

FIG. 4 is a schematic view of the oxygen generator system 100 of FIGS. 1–3. Referring to FIG. 4, an air compressor 110 supplies compressed air along line 111 in the direction of arrow O1 to a splitter 112 that splits the air to two 3-way valves 113, 115 each having respective exhaust mufflers 114, 116, respectively. FIG. 5 describes the control system of the 3-way valves 113, 115.

The system can be set up so that 3-way valve 115 is first closed and valve 113 is first open so that compressed air is first flowed into cylinder container 120, which contains a first molecular sieve bed 125 therein which traps nitrogen within the cylinder container 120 and allows oxygen to flow through purge orifice 122 to line 140 and mixing tank 150 and thereon through line 101 in the direction of arrow O3. Purge orifices 122, 132 have small selective apertures that regulate oxygen flow and can be sized to allow 12 pounds per square inch (psi) therethrough. Mixing tank 150 is a cylinder that acts as a reservoir to further buildup the pressure of the oxygen. Needle valve 60 can be manually set to release a flow rate of approximately 0.2 liters per minute, which together with mixing tank 150 allows for up to approximately 95% oxygen to flow therethrough. A higher flow rate causes the purity of oxygen to drop below 95%.

Referring to FIG. 4, once the first sieve bed 125 becomes full of nitrogen, exhaust valve 113 closes and compressed air from line 111 is directed through now open 3-way valve 115 to second cylinder container 130 which has a second molecular sieve bed 135 therein which traps nitrogen within the cylinder container 130 while allowing separated oxygen to flow through purge orifice 132 to line 140 to mixing tank 150 and so forth. As the second bed 135 is separating oxygen from the nitrogen, the first bed vents its nitrogen into the atmosphere at exhaust 116. When the second bed 135 is full, 3-Way valve 60 closes and compressed air from lines 111, 112 is once again fed into the first bed 125. At this point the nitrogen contained within second bed 135 is vented into the atmosphere via exhaust muffler 116, and the process is repeated continuously causing a constant flow of oxygen to be produced to line 101. The components within the oxygen generating system 100 are extremely compact. For example, cylinders 120, 130 and mixing tank 150 can each have dimensions of approximately 2 inches diameter by approximately 7 inches. The components of the molecular sieve beds 125, 135 in cylinders 120, 130 can be like those described in U.S. Pat. Nos. 4,552,571 and 4,698,075 to Dechene and U.S. Pat. No. 4,636,226 to Canfora, each of which is incorporated by reference. As previously described, the novel oxygen generating system generates up to approximately 95% pure oxygen onsite which can be directly injected into the reservoir water.

FIG. 5 is a schematic view 200 of the timer controls for the 3-way valves used in oxygen generating system of FIG. 4. A 115 VAC supply supplies power along hot line 202 and neutral line 204 from 11 SVAC, 220 power supply and the like, to time switch 230 and terminal block 220, the latter of which supplies power to axle fan 230 and air compressor 110. ON & OFF TIMER 240 controls the alternating operation of 3-Way Valve 113 and 3-Way Valve 115. Axle fan 230 is used to circulate air from outside system 1 to air compressor 110 keeping the air supply to air compressor to not include stale air and also to cool the equipment. Axle fan 230 reduces heated air from building up and being taken in by air-intakes for compressor 230. Time switch 230 can be a external digital timer control such as a Grasslin Timer, manufactured by Grasslin, a time programmable air conditioning thermostat control and the like. M refers to a manual power on and off switch for the oxygen generator system 100 specifically for the air compressor 110, axle fan 230, and other powered components. Labels 3, 4, 5 in box 230 refers to being able to program the On & Off Timer 240 to be able to operate at selected times such as being powered off at night and powered on during weekdays, and the like. Switch 3 connected to contact 5 is an off mode and switch 3 connected to contact 4 is an on mode. On & Off Timer 240 can be a solid state timer such as an ACP Timer manufactured by Precision Timer. On & Off Timer 240 can be preselected to turn 3-way valve 113 on to allow compressed air to pass into sieve bed 125 for approximately 6 seconds while 3-way valve 115 is off. After 6 seconds, valve 113 switches to exhaust muffler 114 for exhausting nitrogen from bed 125. One second later, valve 115 turns on for 6 seconds allowing nitrogen to be absorbed in sieve bed 135. During this time valve 113 is exhausting nitrogen from sieve bed 125 into the atmosphere via exhaust muffler 114 for a total of 7 seconds. After being on for 6 seconds valve 115 turns to an exhaust mode, while valve 113 goes to an on position allowing sieve bed 125 to begin absorbing nitrogen again. The system runs continuously as long as the time switch 130 runs in a power on position time.

Although the preferred embodiment describes using a diffuser, the invention can be practiced with a Venturi-Type injector. The embodiment described can be used without a diffuser, but the oxygen saturation into the water will not be as efficient as when a diffuser or a Venturi-type injector is used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A compact water cooler and oxygen generator system for increasing oxygen within a nonoxygenated water supply, comprising in combination:

a single housing;

a reservoir containing nonoxygenated drinking water having sides and a bottom, supported by the single housing;

a separate nonoxygenated water source located above the reservoir for supplying the nonoxygenated drinking water to the reservoir, the separate nonoxygenated water source chosen from one of bottled water and a tap waterline;

a cooler means within the housing for cooling the nonoxygenated drinking water;

a generator within the housing for generating oxygen; and means within the housing for inserting the oxygen into the reservoir through the bottom of the reservoir and directly oxygenating substantially all of the nonoxygenated drinking water in the reservoir to increase oxygen content in the nonoxygenated drinking water to a supersaturated level.

2. The compact water cooler of claim 1, wherein the inserting means includes:

an oxygen diffuser.

3. The compact water cooler of claim 1, wherein the oxygen generator includes:

an air compressor supplying compressed air to nitrogen and oxygen separating means.

4. The compact water cooler of claim 3, wherein the nitrogen and oxygen separating means includes:

a first molecular sieve bed for absorbing nitrogen; and a second molecular sieve bed for absorbing nitrogen, wherein the first molecular sieve bed alternates in use with the second molecular sieve bed.

5. The compact water cooler of claim 4, further including:

means for exhausting the absorbed nitrogen from the first molecular sieve bed and the second molecular sieve bed.

6. The compact water cooler of claim 4, further including:

a timer for alternating the activation of the first molecular sieve bed and the second molecular sieve bed.

7. The compact water cooler of claim 4, further including:

a first 3-way valve for the first molecular sieve bed; and a second 3-way valve for the second molecular sieve bed.

8. The compact water cooler of claim 7, wherein the first 3-way valve and the second three-way valve each include:

means for exhausting the absorbed nitrogen from the first molecular sieve bed and the second molecular sieve bed into the atmosphere.

9. The compact water cooler of claim 4, wherein the first molecular sieve bed and the second molecular sieve bed each include:

dimensions of less than approximately 5 inches in diameter and less than approximately 10 inches in length.

10. The compact water cooler of claim 4, wherein the first molecular sieve bed and the second molecular sieve bed each include:

dimensions of approximately 2 inches in diameter and approximately 7 inches in length.

11. The compact water cooler of claim 1, wherein the oxygen generator includes:

means for generating up to approximately 95% oxygen onsite.

12. The compact water cooler of claim 1, wherein the single housing includes:

dimensions of approximately 10 to approximately 42 inches high, approximately 7 to approximately 18 inches wide and approximately 8 to approximately 18 inches deep.

13. A compact drinking water cooler and oxygen generator system for increasing oxygen within a nonoxygenated water supply, comprising in combination:

a housing having dimensions of approximately 10 to approximately 42 inches high, approximately 7 to approximately 18 inches wide, and approximately 8 to approximately 18 inches deep;

a reservoir containing purified nonoxygenated drinking water the reservoir having sides and a bottom, supported by the single housing;

a separate nonoxygenated water source located above the reservoir for supplying the nonoxygenated drinking water to the reservoir, the separate nonoxygenated water source chosen from one of: bottled water and a tap waterline;

a cooler means within the housing for cooling the nonoxygenated drinking water in the reservoir;

a generator within the housing for generating up to approximately 95% oxygen; and means within the housing for injecting the oxygen into the reservoir through the bottom of the reservoir and directly oxygenating substantially all of the nonoxygenated drinking water in the reservoir to increase oxygen content in the nonoxygenated drinking water to a supersaturated level.

14. The compact water cooler of claim 13, wherein the reservoir of nonoxygenated drinking water includes:

nonoxygenated bottled water.

15. The compact water cooler of claim 13, wherein the reservoir of nonoxygenated drinking water includes:

a source from a tap waterline.

16. The compact water cooler of claim 15, further including:

a filter between the source and the reservoir.

* * * * *